(12) United States Patent
Shigehisa et al.

(10) Patent No.: US 8,599,422 B2
(45) Date of Patent: Dec. 3, 2013

(54) IMAGE PROCESSING APPARATUS, DATA PROCESSING METHOD AND DATA PROCESSING PROGRAM

(75) Inventors: Kei Shigehisa, Amagasaki (JP); Takeshi Morikawa, Takarazuka (JP); Nobuo Kamei, Amagasaki (JP); Takeshi Minami, Amagasaki (JP); Masayuki Yoshii, Sakai (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1207 days.

(21) Appl. No.: 12/041,772

(22) Filed: Mar. 4, 2008

(65) Prior Publication Data

US 2008/0218798 A1 Sep. 11, 2008

(30) Foreign Application Priority Data

Mar. 7, 2007 (JP) ................................. 2007-057711

(51) Int. Cl.
*G06K 15/00* (2006.01)
(52) U.S. Cl.
USPC ....... 358/1.16; 358/1.13; 358/1.15; 358/1.18; 707/622; 707/721; 709/212; 709/213; 709/216
(58) Field of Classification Search
None
See application file for complete search history.

(56) References Cited

U.S. PATENT DOCUMENTS 5,251,315 A * 10/1993 Wang ..................................... 1/1
6,031,634 A * 2/2000 Shimada et al. .......... 358/426.12

2001/0054045 A1 * 12/2001 Shirasaka ..................... 707/204
(Continued)

FOREIGN PATENT DOCUMENTS

| JP | 2002-334088 | | 11/2002 |
| JP | 2004-362418 A | | 12/2004 |
| JP | 2004362418 A | * | 12/2004 |
| JP | 2006-260464 | | 9/2006 |

OTHER PUBLICATIONS

Fukumura, Masashi, JP 200436218 (Computer Generated English Translation).*

(Continued)

*Primary Examiner* — Miya J Cato
(74) *Attorney, Agent, or Firm* — Buchanan Ingersoll & Rooney PC

(57) ABSTRACT

An image processing apparatus comprises a first storage area that stores in itself original data to be copied; a copier that copies the original data to a second storage area that is shared and allowed to be accessed by a plurality of users belonging to one same group, by storing reference information pointing to the original data stored in the first storage area, in the second storage area; a judger that judges whether or not all of access judgment target users who are the group users sharing the second storage area or preliminarily specified users, make access to the reference information stored by the copier in the second storage area; and a controller that suspends execution of an instruction given to change the original data for the access judgment target users so that the original data could be provided to all of them, if the judger judges that only some of the access judgment target users has made access to the reference information when the instruction to change the original data is given, and then, cancels the suspension after the original data is provided to all of the access judgment target users.

17 Claims, 12 Drawing Sheets

(56) References Cited

U.S. PATENT DOCUMENTS

| | | | |
|---|---|---|---|
| 2005/0195434 A1* | 9/2005 | Ohara et al. | 358/1.16 |
| 2006/0126101 A1* | 6/2006 | Shutt et al. | 358/1.15 |
| 2006/0156344 A1* | 7/2006 | Iwata et al. | 725/58 |
| 2006/0212497 A1 | 9/2006 | Tomita | |
| 2007/0271317 A1* | 11/2007 | Carmel | 707/204 |

OTHER PUBLICATIONS

Notification of Reasons for Refusal in JP 2007-057711 dated Jan. 27, 2009, and an English Translation thereof.

* cited by examiner

IMAGE PROCESSING APPARATUS, DATA PROCESSING METHOD AND DATA PROCESSING PROGRAM

This application claims priority under 35 U.S.C. §119 to Japanese Patent Application No. 2007-57711 filed on Mar. 7, 2007, the entire disclosure of which is incorporated herein by reference in its entirety.

BACKGROUND OF THE INVENTION

1. Field of the Invention

The present invention relates to an image processing apparatus that is used by a plurality of users belonging to one same group to share data stored in a storage area that is allowed to be accessed only by the group users, a data processing method used in the image processing apparatus, and a data processing program stored in a computer readable recording medium to make a computer provided in the image processing apparatus execute image processing.

2. Description of the Related Art

The following description sets forth the inventor's knowledge of related art and problems therein and should not be construed as an admission of knowledge in the prior art.

In recent years, an art is generally used, wherein personal storage areas used by individual users respectively, and a group storage area that is used by a plurality of users belonging to one same group and allowed to be accessed only by the group users, are created in a recording medium such as a hard disk drive (hereinafter to be referred to also as "HDD") of an image processing apparatus represented by a MFP (Multi Function Peripheral) that is a multifunctional digital machine. With this image processing apparatus, a user copies data such as document data, image data, etc. stored in his/her own personal storage area to the group storage area, so as to share information with the other group users.

Meanwhile, another art is heretofore known, wherein original data is not physically copied to a copy destination but reference information that is pointer information pointing to the original data stored in a storage location of a storage area is stored in a copy destination, so that the storage capacity of an HDD, etc. can be saved. And when a user makes access to the reference information, the original data stored in the storage location, to which is pointed by the pointer information, is called out and displayed. And thereby a result that is the same as expected in the case of physically copying the original data to a copy destination is drawn.

However, this art described above still leaves an issue. That is, if the original data happens to be changed (updated, deleted or etc.), the reference information is also changed accordingly, and a user cannot call the original data any more even if makes access to the reference information. Similarly, in such a case where reference information pointing to original data is stored in a group storage area and thereby the original data is copied to the group storage area, if the original data happens to be changed after some of the group users make access to the reference information stored therein, different data will be provided to the users having made access and the other users not having made access, which could not achieve information sharing among the group users.

According to an art disclosed in Japanese Laid-open Patent Publication No. 2004-362418, if file data to which is pointed by pointer information happens to be updated, the file data is temporarily stored. And when a user makes access to new pointer information after the update, a notification is transmitted to let him/her know that file data to which is pointed by the new pointer information is not the original file data, and he/she makes selection whether or not to receive the updated data, and then his/her selection is accepted.

However, this art disclosed in the publication above still leaves an issue. That is, even if users belonging to one same group would like to share data, they tend to make different selections whether or not to receive the updated data. And some users who select receiving the updated data and the other users who do not select receiving the updated data will have different data, which could not achieve information sharing among the group users.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide an image processing apparatus that is capable of eliminating inconvenience that may be caused, that is, if an instruction to change original data is given in the case where reference information pointing to the original data is stored in a group storage area and thereby the original data is copied to the group storage area, different data will be provided to users having made access to the reference information and other users not having made access thereto.

It is another objective of the present invention to provide a data processing method that is capable of eliminating inconvenience that may be caused, that is, if an instruction to change original data is given in the case where reference information pointing to the original data is stored in a group storage area and thereby the original data is copied to the group storage area, different data will be provided to users having made access to the reference information and other users not having made access thereto.

It is yet another objective of the present invention to provide a data processing program stored in a computer readable recording medium to make a computer execute image processing by the image processing method.

According to a first aspect of the present invention, an image processing apparatus comprises:

a first storage area that stores in itself original data to be copied;

a copier that copies the original data to a second storage area that is shared and allowed to be accessed by a plurality of users belonging to one same group, by storing reference information pointing to the original data stored in the first storage area, in the second storage area;

a judger that judges whether or not all of access judgment target users who are the group users sharing the second storage area or preliminarily specified users, make access to the reference information stored by the copier in the second storage area; and a controller that suspends execution of an instruction given to change the original data for the access judgment target users so that the original data could be provided to all of them, if the judger judges that only some of the access judgment target users has made access to the reference information when the instruction to change the original data is given, and then, cancels the suspension after the original data is provided to all of the access judgment target users.

According to a second aspect of the present invention, a data processing method used in an image processing apparatus, comprises:

copying original data stored in a first storage area, to a second storage area that is shared and allowed to be accessed by a plurality of users belonging to one same group, by storing reference information pointing to the original data stored in the first storage area, in the second storage area;

judging whether or not all of access judgment target users who are the group users sharing the second storage area or preliminarily specified users, make access to the reference information stored in the second storage area; and suspending execution of an instruction given to change the original data for the access judgment target users so that the original data could be provided to all of them, if it is judged that only some of the access judgment target users has made access to the reference information when the instruction to change the original data is given, and then, cancelling the suspension after the original data is provided to all of the access judgment target users.

According to a third aspect of the present invention, a data processing program stored in a computer readable recording medium to make a computer provided in an image processing apparatus execute:

copying original data stored in a first storage area, to a second storage area that is shared and allowed to be accessed by a plurality of users belonging to one same group, by storing reference information pointing to the original data stored in the first storage area, in the second storage area;

judging whether or not access judgment target users who are all of the group users sharing the second storage area or preliminarily specified users, make access to the reference information stored in the second storage area; and suspending execution of an instruction given to change the original data for the access judgment target users so that the original data could be provided to all of them, if it is judged that only some of the access judgment target users has made access to the reference information when the instruction to change the original data is given, and then, cancelling the suspension after the original data is provided to all of the access judgment target users.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Embodiment-1

Figure 1:
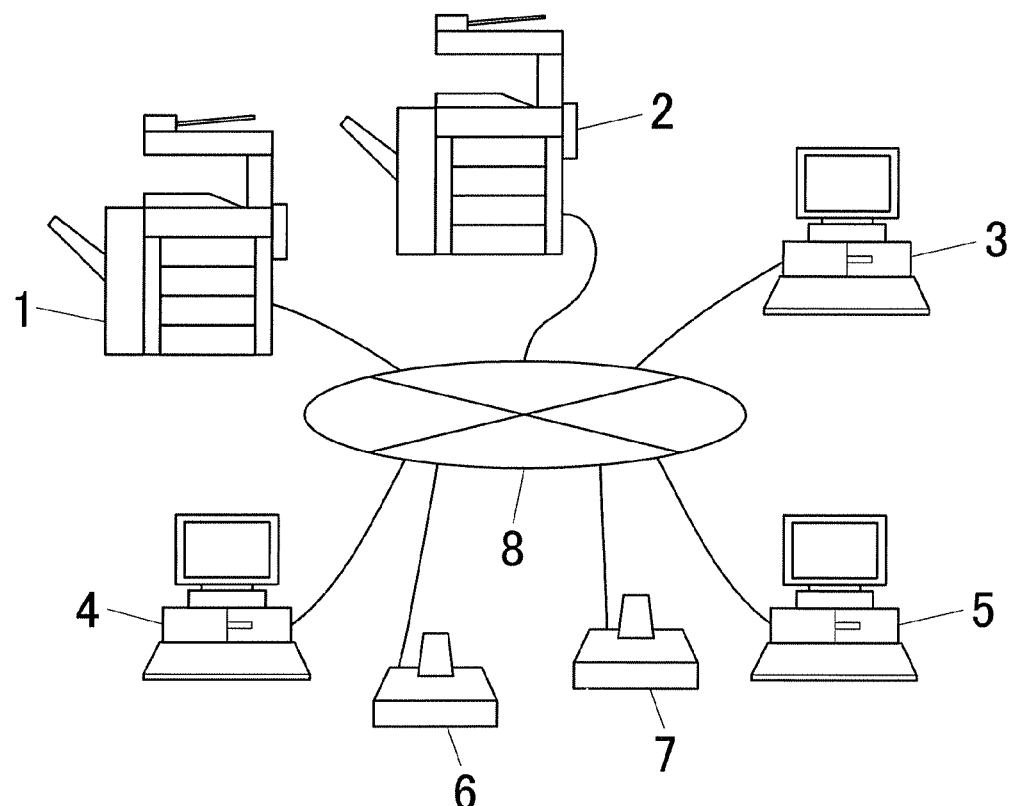
FIG. 1 is a view showing a configuration of an image processing system according to a first embodiment of the present invention.

FIG. 1 is a view showing a configuration of an overall image processing system in which an image processing apparatus according to one embodiment of the present invention is used;

This image processing system comprises image processing apparatuses 1 and 2, terminal apparatuses 3, 4 and 5 that are personal computers, FAX apparatuses 6 and 7, and etc., and these apparatuses are connected to each other via a communication circuit 8.

Each of the image processing apparatuses 1 and 2, the terminal apparatuses 3, 4 and 5, has its own identification information that is an IP address and a computer name, and the apparatuses identify each other by their own identification information. Further, each of the FAX apparatuses 6 and 7 has a phone number that is generally used for fixed-line phones or IP phones.

Each of the image processing apparatuses 1 and 2 is a MFP (Multi Function Peripheral) that is a multifunctional digital machine collectively having various functions such as copying, network printing, scanning, FAX and document serving, and executes jobs such as print jobs transmitted from the terminal apparatuses 3, 4, and 5. Further, a hard disk drive 35 (shown in FIG. 3) of the image processing apparatus 1 has its storage area divided into a plurality of storage areas (hereinafter, to be referred also as "boxes"). In this embodiment, the hard disk drive 35 has first storage areas that are personal storage areas (hereinafter, to be referred as "personal boxes G1") each assigned for an individual user and storing data of an individual user, and second storage areas that are group storage areas (hereinafter, to be referred as "group boxes G2") each assigned for a group, shared by a plurality of users belonging to one same group, and storing data of a group.

Further, it also can be configured such that users are not allowed to use the image processing apparatuses 1 and 2 without user authentication using user information preliminarily registered therein respectively. With this configuration, a user hoping to use the image processing apparatuses 1 and 2 is required to transmit his/her user information via the terminal apparatuses 3, 4 or 5, or via an operation portion 11 (shown in FIG. 3).

Each of the terminal apparatuses 3, 4 and 5 has document creation software for users to create thereby documents, images and etc., and other various software including printer drivers for the image processing apparatus 1 and 2. When a user gives a print instruction after creating a document, image or etc., using the document creation software, the print driver for the image processing apparatus 1 or 2 generates a print job then transmits it via the communication circuit 8 to the image processing apparatus 1 or 2.

Each of the FAX apparatuses 6 and 7 performs signal processing including data compression, signal modulation and etc., on image data read out from a document, and then transmits the image-processed data via the communication circuit 8 to the image processing apparatuses 1 and 2, the other FAX apparatus and etc. or receives the image-processed image data from other apparatuses.

The communication circuit 8 is a LAN, the internet, a public line or etc., and is used to transmit/receive data such as image data between the apparatuses.

Hereinafter, a configuration of the image processing apparatus 1 will be detailed on behalf of the image processing apparatuses 1 and 2, since their configurations are the same.

Figure 2:
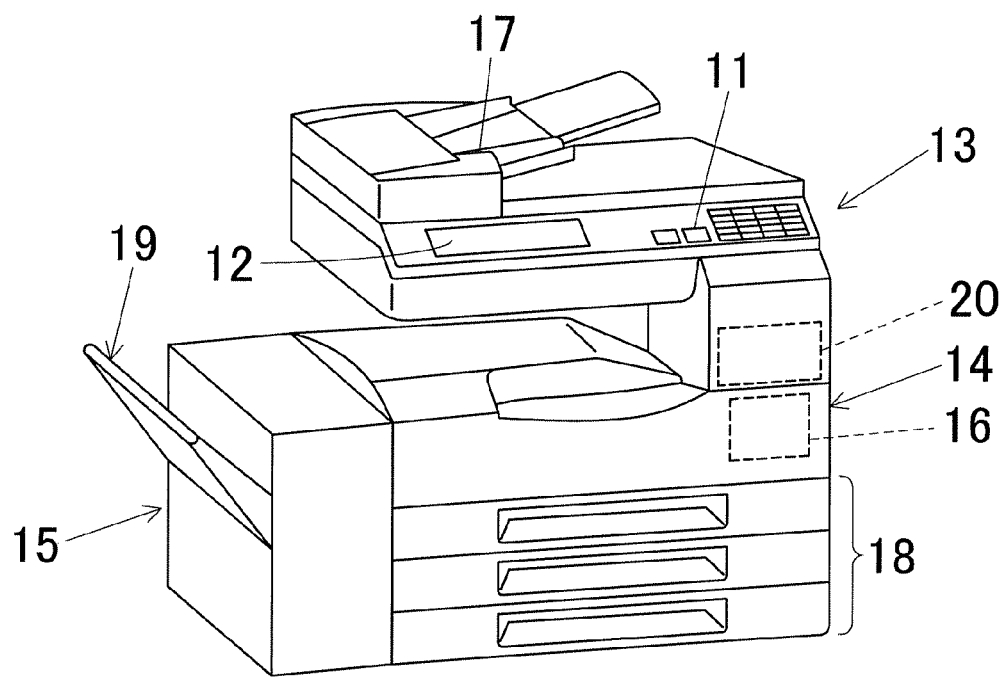
FIG. 2 is a view showing a configuration of an image processing apparatus.

As shown in FIG. 2, the image processing apparatus 1 comprises an operation portion 11, a display 12, a scanner 13, a printer 14, a finisher 15, a communication interface 16, a document feeder 17, a sheet feeder 18, a sheet discharge tray 19, a controller 20 and etc.

The operation portion 11 comprises a plurality of keys to enter numbers, characters, marks and etc., a sensor to detect pressed keys, a transmission circuit to transmit signals indicating the detected keys to a CPU 30 (shown in FIG. 3) of the controller 20, and others.

The display 12 displays a screen giving a message or an instruction to users, a screen for users to enter a preferable setting or process, a screen showing users an image formed and a processing result drew by the image processing apparatus 1, and other screens. Further, a touch panel is employed for the display 12 in this embodiment, and the display 12 detects locations touched by users with fingers on the touch panel and transmits signals indicating the detecting results to the CPU 30.

As explained above, each of the operation portion 11 and the display 12 functions as a user interface so that users can directly operate the image processing apparatus 1. Further, each of the terminal apparatuses 3, 4 and 5 has an application program and others installed thereon to give instructions to the image processing apparatus 1, so that users also can operate the image processing apparatus 1 remotely via the terminal apparatus 3, 4 and 5, not via the operation portion 11 and the display 12.

The scanner 13 photoelectrically reads information of image such as a photo, text, a picture, etc. that is on a document, and thereby acquires image data. The acquired image data (density data) is converted into digital data by an image processor (not shown in Figure), and heretofore known various image processes are performed on the image data, and then transmitted to the printer 14 or the communication interface 16, or stored in the hard disk drive 35 for later use.

The printer 14 prints on recording sheets of paper, film, or etc. loaded in the sheet feeder 18, the image data acquired by the scanner 13, the image data received from an external terminal apparatus by the communication interface 16, or the image data stored in the hard disk drive 35.

The finisher 15 automatically performs post-processes such as stapling, punching and etc.

Figure 3:
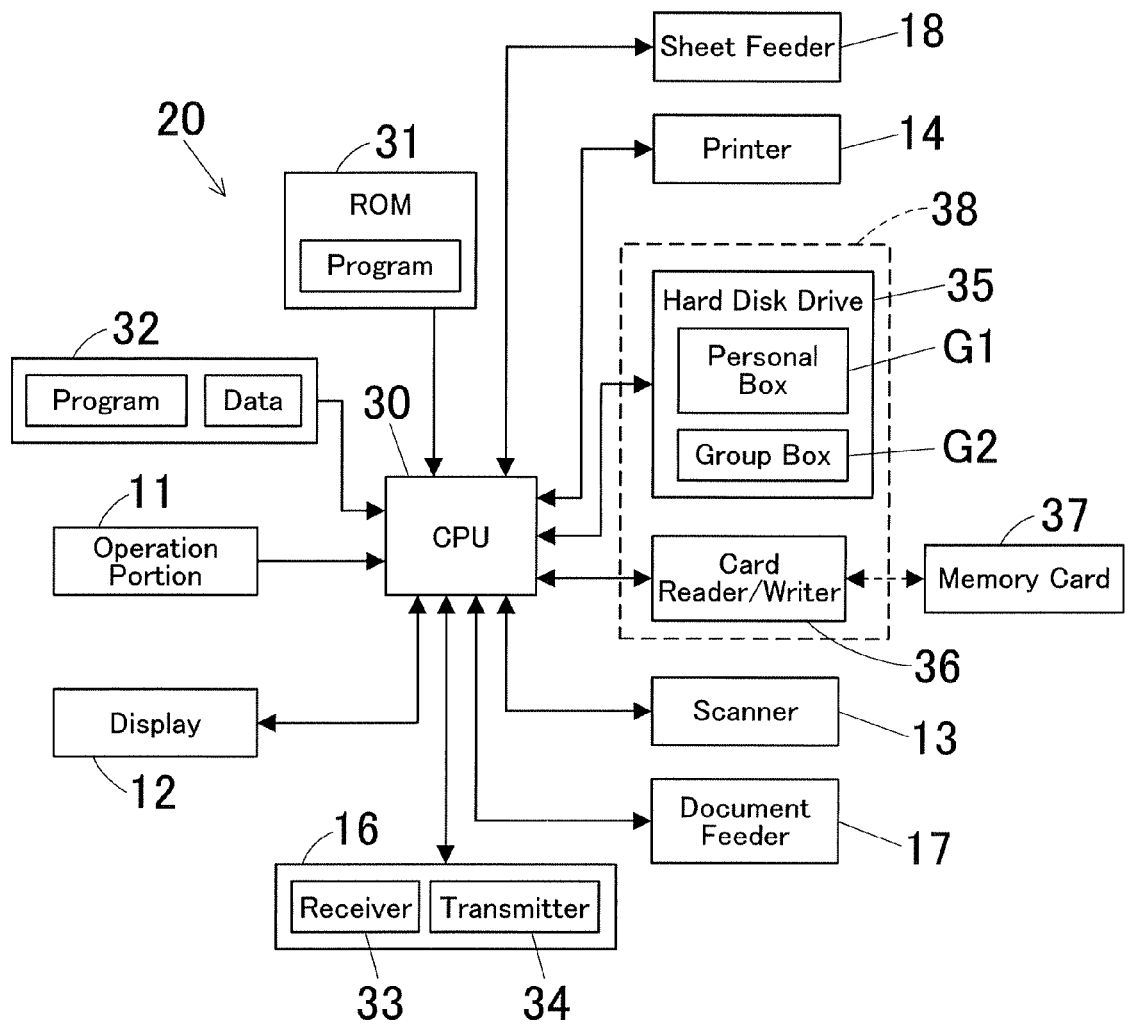
FIG. 3 is a block diagram showing an electrical configuration of the image processing apparatus.

The communication interface 16 is a NIC, a modem, a TA, or etc., and comprises a receiver 33 and a transmitter 34 as shown in FIG. 3. It exchanges image data and other data with external apparatuses such as the image processing apparatus 2, terminal apparatuses 3, 4 and 5, FAX apparatuses 6 and 7, and etc.

The receiver 33 receives data transmitted by the external apparatuses, and the transmitter 34 transmits image data read out by the scanner 13 and other data to the external apparatuses.

The document feeder 17 automatically transfers a document placed thereon to the document reading position that is the scanner 13.

The sheet feeder 18 is provided in the lower position of the image processing apparatus 1. It loads recording sheets of paper, film or etc., and selects preferable recording sheets automatically or according to user instruction, then transfers them to the printer 14.

The sheet discharge tray 19 discharges recording sheets of paper, film or etc. that have images printed thereon by the printer 14 and is post-processed (stapled, punched, etc.) by the finisher 15.

FIG. 3 is a block diagram showing an electrical configuration of the image processing apparatus 1.

The controller 20 comprises a CPU 30, a ROM 31, a RAM 32 and etc.

The CPU 30 controls the entire image processing apparatus 1 by executing a program stored in the ROM 31 or a program loaded in the RAM 32. Especially in this embodiment, the CPU 30 further controls data processing using the personal box G1 and the group box G2, which will be detailed later.

The ROM 31 stores a program executed by the CPU 30 and other data.

The RAM 32 is an operation area for the CPU 30 to execute processing, and temporarily stores a program and data to be used when the CPU 30 executes the program.

A data storage 38 comprises a hard disk drive 35, a card reader/writer 36 and etc.

The hard disk drive (HDD) 35 has an area to store image data read out by the scanner 13 and image data and other data transmitted via the communication interface 16 by the terminal apparatuses 3, 4 and 5, and the FAX apparatuses 6 and 7, an area to store a job mode history, and an area to store the boxes. The box storage area has one or a plurality of personal boxes G1 and a group box G2. The data stored in the HDD 35 can be also accessed via the network from the image processing apparatus 2.

The card reader/writer 36 reads and writes image data from and in a memory card 37.

The memory card 37 is a portable recording medium such as a compact flash (the registered trademark), a smart media or etc., and is used for use in data backup or other.

Explanation about the operation portion 11, the display 12, the scanner 13, the printer 14, the communication interface 16, the document feeder 17 and the sheet feeder 18 is omitted here, since those are already explained.

[Operations of the Image Processing Apparatus 1]

A procedure performed in the image processing apparatus 1, to perform data processing using personal boxes G1 and a group box G2, will be explained with reference to flowcharts shown in FIG. 4 and FIG. 5, and drawings shown in FIG. 6. This procedure is executed by the CPU 30 according to a program stored in a recording medium such as the ROM 31.

In an embodiment to be described hereinafter, data such as image data and document data are preliminarily stored in a personal box G1 by a user owning the personal box G1. And this user is trying to copy data stored in his/her personal box G1 to a group box G2 of a group to which he/she belongs. The copy operation will be detailed as follows. That is, original data that is target data stored in the personal box G1 is not physically copied to the group box G2, but reference information that is pointer information indicating a storage location of the original data within the storage area of HDD 35 is stored in the group box G2, and when a user makes access to the reference information, the original data that is the pointing destination is called from a storage location indicated by the pointer information and displayed.

In other words, these operations to store in the group box G2 the reference information pointing to the original data are performed as under the pretense that the original data is physically copied to the group box G2. Actually, the data is not physically copied, and thereby the storage capacity of the HDD 35 is saved. In this case, if an instruction to change (for example, update or delete) the original data is given, the instruction is executed and accordingly the changed data is provided to the user making access to the reference information. Especially in this embodiment, execution of an instruction given to change the original data is suspended under a certain condition for users who make access to the reference information stored in the group box G2.

In an embodiment to be explained hereinafter, the original data is document data. However, the original data is not limited to document data, and can be other data such as image data.

Figure 4:
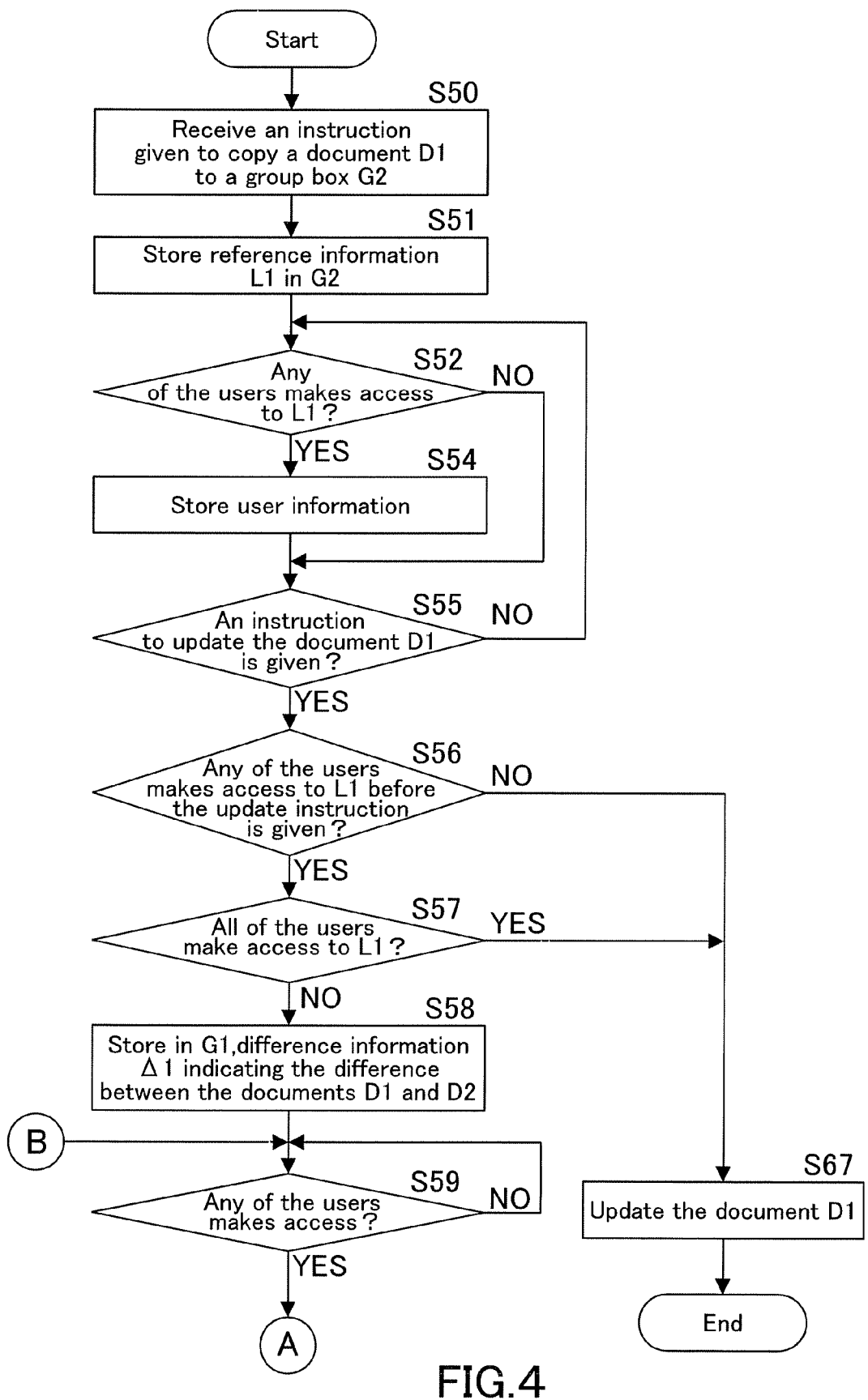
FIG. 4 is a flowchart to explain a procedure performed in the image processing apparatus according to the first embodiment of the present invention.
Figure 5:
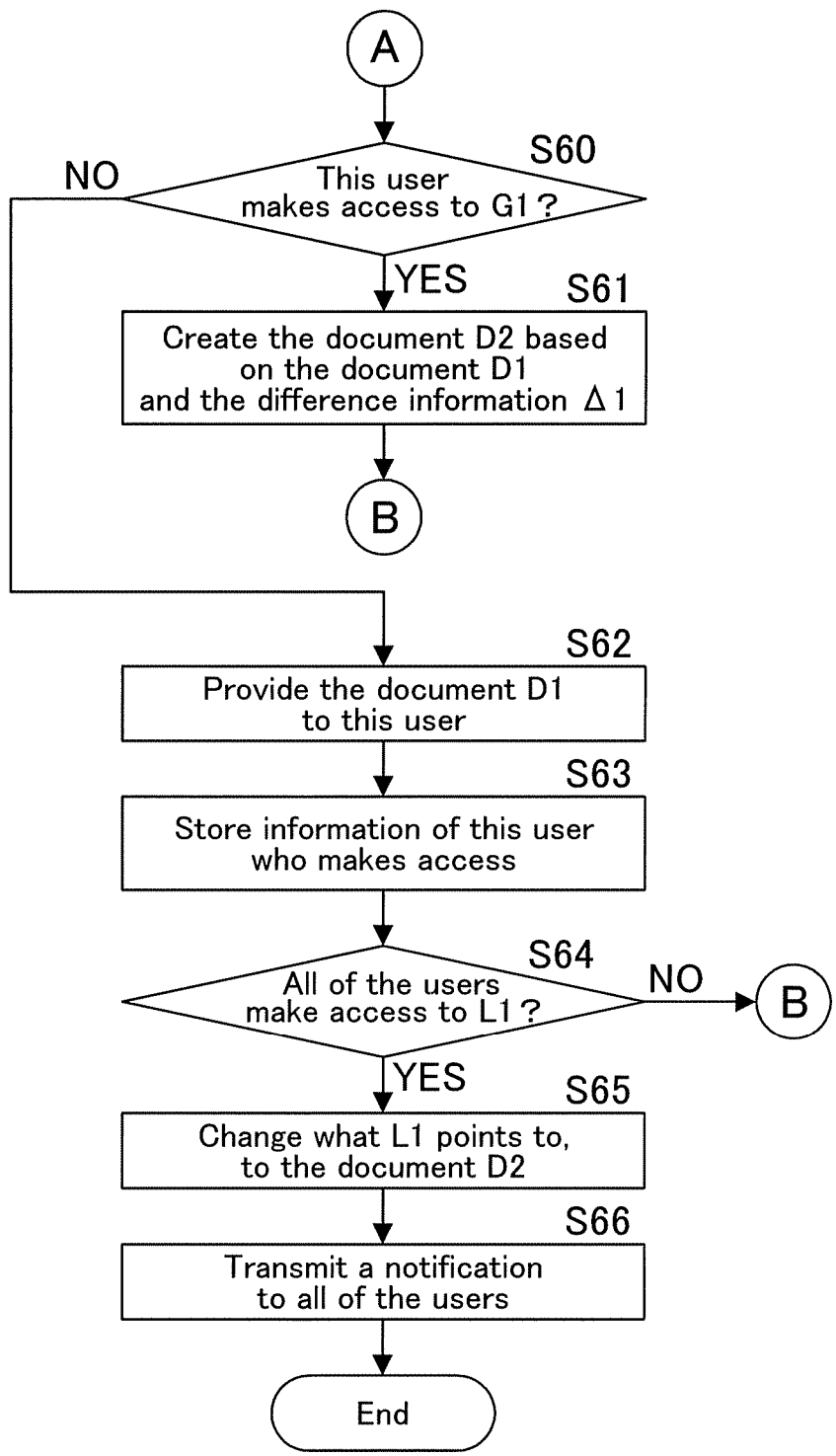
FIG. 5 is a flowchart continued from the FIG. 4.
Figure 6:
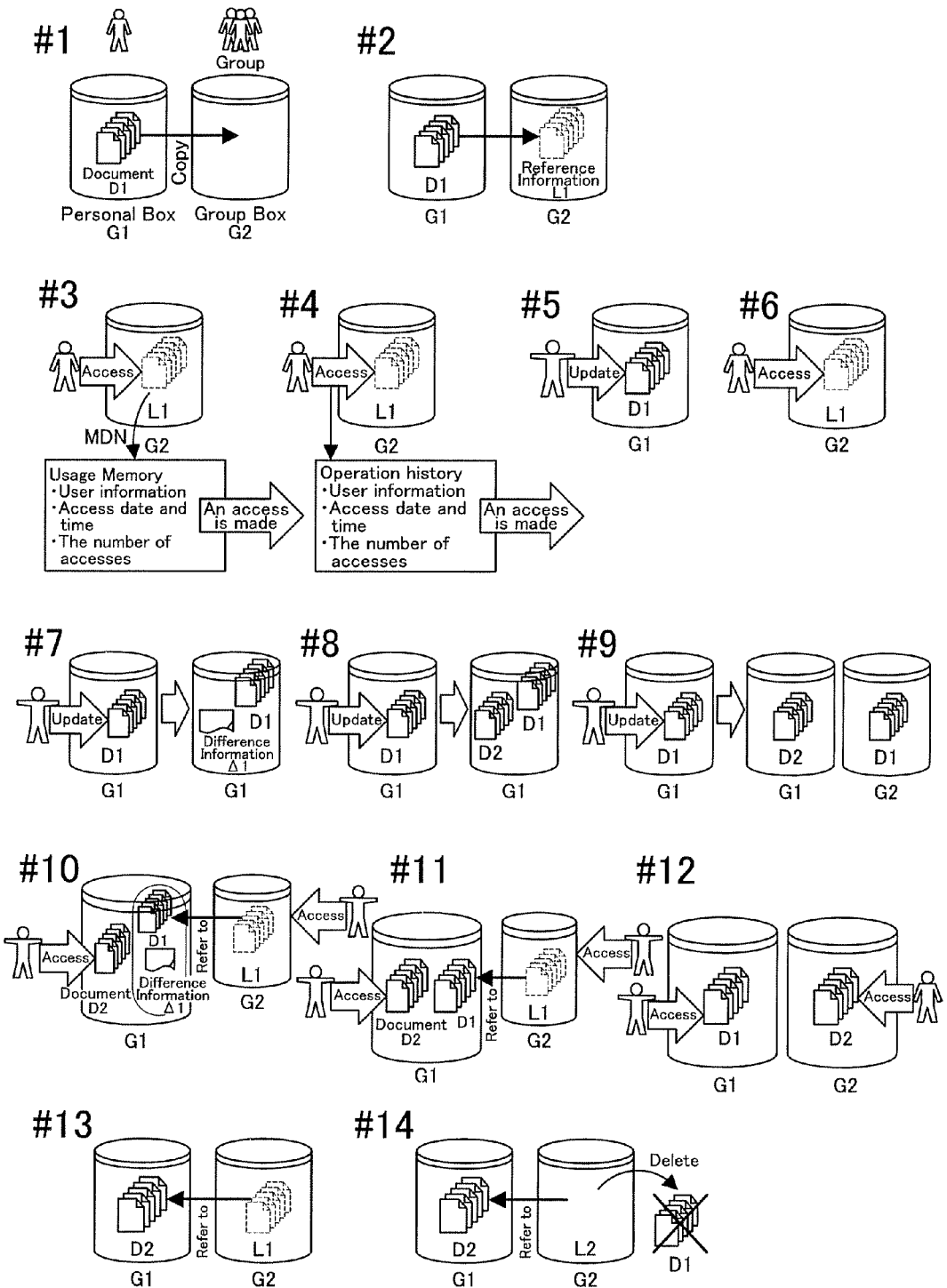
FIG. 6 shows drawings to explain typical operations in the first embodiment, a second embodiment and a third embodiment of the present invention.

If an instruction given by a user to copy a document D1 that is original data stored in a personal box G1 of the image processing apparatus 1, to a group box G2 of the image processing apparatus 2, is received by the CPU 30 (see Step S50 in FIG. 4 and #1 in FIG. 6), then only reference information L1 pointing to the document D1 is stored in the group box G2 of the image processing apparatus 2 (see Step S51 in FIG. 4 and #2 in FIG. 6).

Subsequently, it is judged whether or not any of the users makes access to the reference information L1 stored in the group box G2 (Step S52 in FIG. 4). This judgment is made based on a notification received from the image processing apparatus 2. That is, if a user makes access to the reference information L1 stored in the group box G2 as shown in #3 and #4, information of the user, such as user information, access information and the number of accesses, which originates from MDN (Message Disposition Notification) or an operation history, is notified via the communication circuit 8 by the image processing apparatus 2. Based on the notification, it is judged whether or not any of the users makes access.

In this embodiment, users who are the targets of access judgment are assumed as "access judgment target users". The access judgment target users can be all of the group users sharing the group box G2, or some users preliminarily specified among the group users in an arbitrary manner. For example, the access judgment target users can be defined as users other than the user who gives an instruction to copy the document to the group box G2.

If it is judged that none of the users makes access to the reference information L1 (NO in Step S52), the routine proceeds to Step S55. If it is judged that any of the users makes access (YES in Step S52), information of this user, such as user information, is stored in the HDD 35 (Step S54), then the routine proceeds to Step S55.

In Step S55, it is judged by the CPU 30 whether or not an instruction to update the document D1 stored in the personal box G1 is given. If it is judged that an instruction to update the document D1 is not given (NO in Step S55), the routine returns to Step S52, and repeats Steps S52 through S55 until it is judged that an instruction to update the document D1 is given. On the other hand, if an instruction to update the document D1 stored in the personal box G1 is given as shown in #5 in FIG. 6 (hereinafter, the updated document D1 will be assumed as a document D2), it is judged as "YES" in Step S55. Then the routine proceeds to Step S56, wherein it is judged whether or not any of the access judgment target users makes access to the reference information L1 stored in the group box G2 before an instruction to update the document D1 is given. This judgment is made based on the information stored in Step S54.

If it is judged that none of the access judgment target users makes access before an instruction to update the document D1 is given (NO in Step S56), the routine proceeds to Step S67, wherein the document D1 is overwritten with the document D2 thereby the update instruction is executed, since the document D1 that is the original document is not yet provided to any of the access judgment target users. And then, the routine terminates.

If it is judged that any of the access judgment target users makes access to the reference information L1 before an instruction to update the document D1 is given as shown in #6 in FIG. 6 (YES in Step S56), then it is judged by the CPU 30 whether or not all of them makes access to the reference information L1 (Step S57), since different documents are provided to the users who already make access and the other users who do not make access to the reference information L1, if the document D1 is overwritten with the document D2 without this judgment.

If it is judged that all of the access judgment target users make access (YES in Step S57), the routine proceeds to Step S67 and the document D1 is overwritten with the document D2, since information sharing is achieved. If it is judged that only some of the access judgment target users do not make access to the reference information L1 (NO in Step S57), difference information Δ1 indicating the difference between the document D1 and the document D2, is stored in his/her personal box G1 by the CPU 30 (see Step S58 in FIG. 4 and #7 in FIG. 6), since information sharing will not be achieved if the document D1 is overwritten with the document D2 without this judgment.

Subsequently, it is judged whether or not any of them makes access to the personal box G1 or the reference information L1 stored in the group box G2 (Step S59). If it is judged that none of them makes access (NO in Step S59), the routine waits until it is judged that any of them makes access. If it is judged that any of them makes access (YES in Step S59), then it is judged by the CPU 30 whether this user makes access to the personal box G1 or the reference information L1 stored in the group box G2 (Step S60 in FIG. 5).

If it is judged that this user makes access to the personal box G1 (YES in Step S60), the document D2 is created by the CPU 30 based on the document D1 and the difference information Δ1, then provided to this user (see Step S61 in FIG. 5 and #10 in FIG. 6), since he/she has a possibility of exactly being the user who gives an instruction to update the document D1 and maybe the document D1 that is the original data is not needed to be provided to this user again. And then, the routine returns to Step S59. On the other hand, if it is judged that this user makes access to the reference information L1 stored in the group Box G2 (NO in Step S60), what the reference information L1 points to is not changed but set still as the document D1, then the document D1 is provided to this user (see Step S62 in FIG. 5 and #10 in FIG. 6), since he/she has a possibility of not being the user who gives an instruction to update the document D1 and maybe the document D1 is not yet provided to this user. In other words, execution of an instruction given to update the document D1 is suspended for the access judgment target users.

Then, information of the user who makes access to the reference information L1 stored in the group box G2 is stored (Step S63), and it is judged whether or not all of the access judgment target users make access to the reference information L1 stored in the group box G2 (Step S64).

If it is judged that not all of the access judgment target users make access (NO in Step S64), the routine returns to Step S59, since some of them do not make access to the document D1. If it is judged that all of the access judgment target users make access (YES in Step S64), the document D1 is overwritten with the document D2, the difference information Δ1 is deleted, and what the reference information L1 points to is changed to the document D2 stored in the personal box G1, by the CPU 30 (see Step S65 in FIG. 5 and #13 in FIG. 6), since information sharing is achieved. That is, the suspension of execution of an instruction given to update the document D1 stored in the personal box G1 is canceled, and the update instruction is executed.

Then, a notification that reference information pointing to the updated data is stored in the group box G2, i.e. the original data is updated, is transmitted to all of the access judgment target users (Step S66). And then, the routine terminates. In this way, they know that their having document D1 has been updated. The notification can be transmitted by e-mail, and can be issued when they login the image processing apparatus 1 or when they make access to the group box G2.

In this embodiment as described above, if only some of the access judgment target users has made access to the reference information L1, i.e. not all of them have made access thereto when an instruction to update the document D1 is given, the document D1 that is the original data is provided to users making access to the reference information L1, until all of them make access thereto. That is, execution of an instruction given to update the document D1 is suspended for the access judgment target users, and the document D1 will be provided to all of them. In this way, information sharing is achieved, which improves user convenience of the image processing apparatus. Further, if the user owning the personal box G1 makes access to the personal box G1, the document D2 that is the updated data, i.e. created based on the document D1 and the difference information Δ1 is provided to him/her. And thereby, an instruction given to update the document D1 is executed for the user owning the personal box G1. After the document D1 is provided to all of the access judgment target users, what the reference information L1 points to is changed to the document D2 thereby an instruction given to update the document D1 is executed, which prevents execution of the update instruction from being suspended unnecessarily longer.

Although it is assumed in this embodiment above that the group box G2 exists in the image processing apparatus 2, the group box G2 also can exist in the image processing apparatus 1 just like the personal boxes G1.

Embodiment-2

Hereinafter, a second embodiment of the present invention will be explained. In the first embodiment of the present invention, difference information Δ1 indicating the difference between a document D2 that is the updated data and a document D1 that is original data, is created and stored, and then the document D2 is created based on the document D1 and the difference information Δ1. Meanwhile, in the second embodiment of the present invention, a document D2 that is the updated data and a document D1 that is original data are both stored in a personal box G1, and then what the reference information L1 points to is set still as the document D1 thereby execution of an instruction given to update the document D1 is suspended, until the document D1 is provided to all of the access judgment target users. And after the document D1 is provided to all of them, what the reference information L1 points to is changed to the document D2, thereby suspension of execution of the update instruction is canceled.

Since an image processing apparatus according to the second embodiment of the present invention has the same configuration as the image processing apparatus 1 according to the first embodiment of the present invention, its explanation is omitted here.

[Operations of the Image Processing Apparatus 1]

Hereinafter, a procedure performed in the image processing apparatus 1 will be explained with reference to flowcharts shown in FIG. 7 and FIG. 8, and drawings in FIG. 6. This procedure is executed by the CPU 30 according to a program stored in a recording medium such as the ROM 31.

Figure 7:
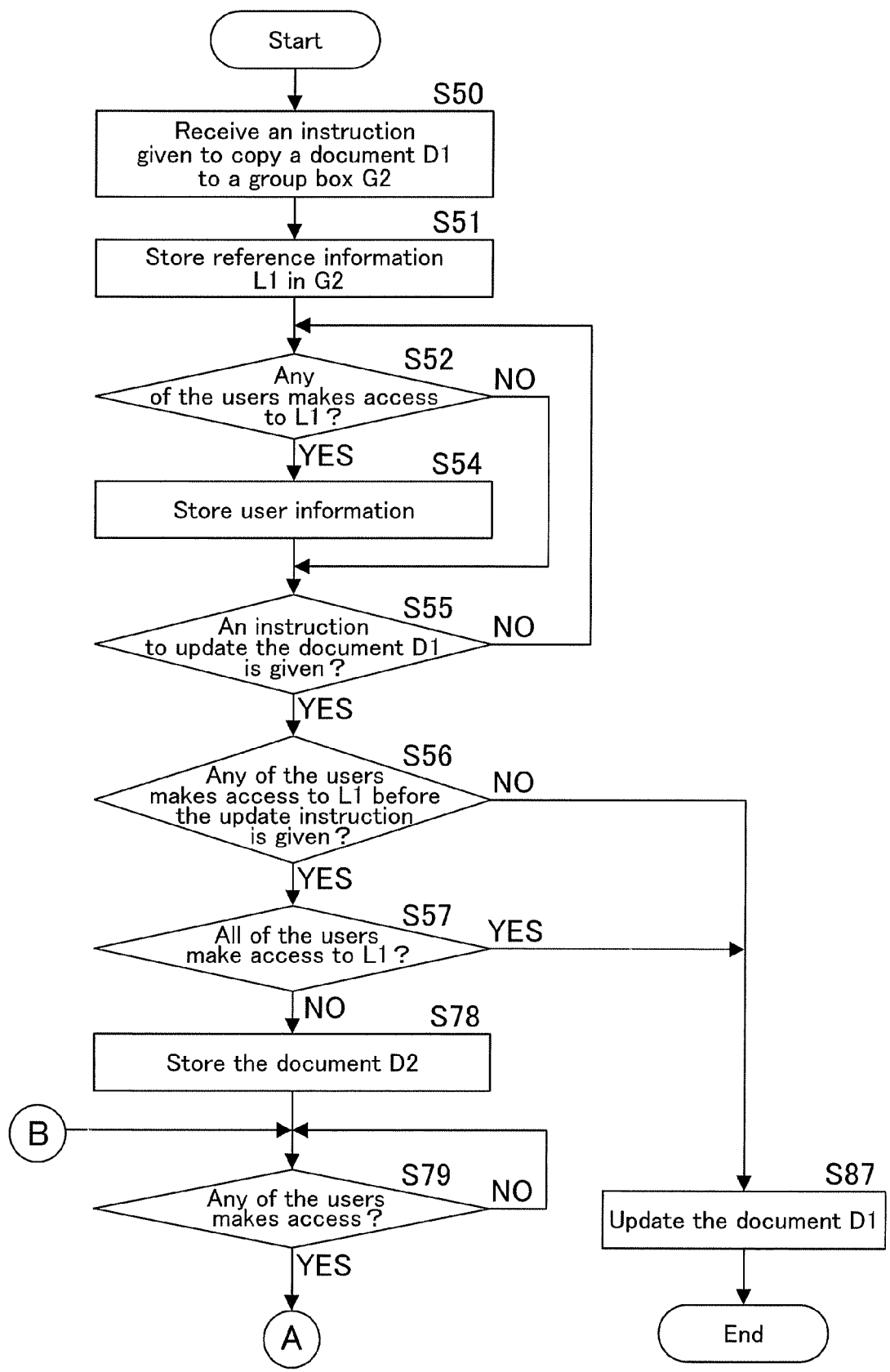
FIG. 7 is a flowchart showing a procedure performed in the image processing apparatus according to the second embodiment of the present invention.
Figure 8:
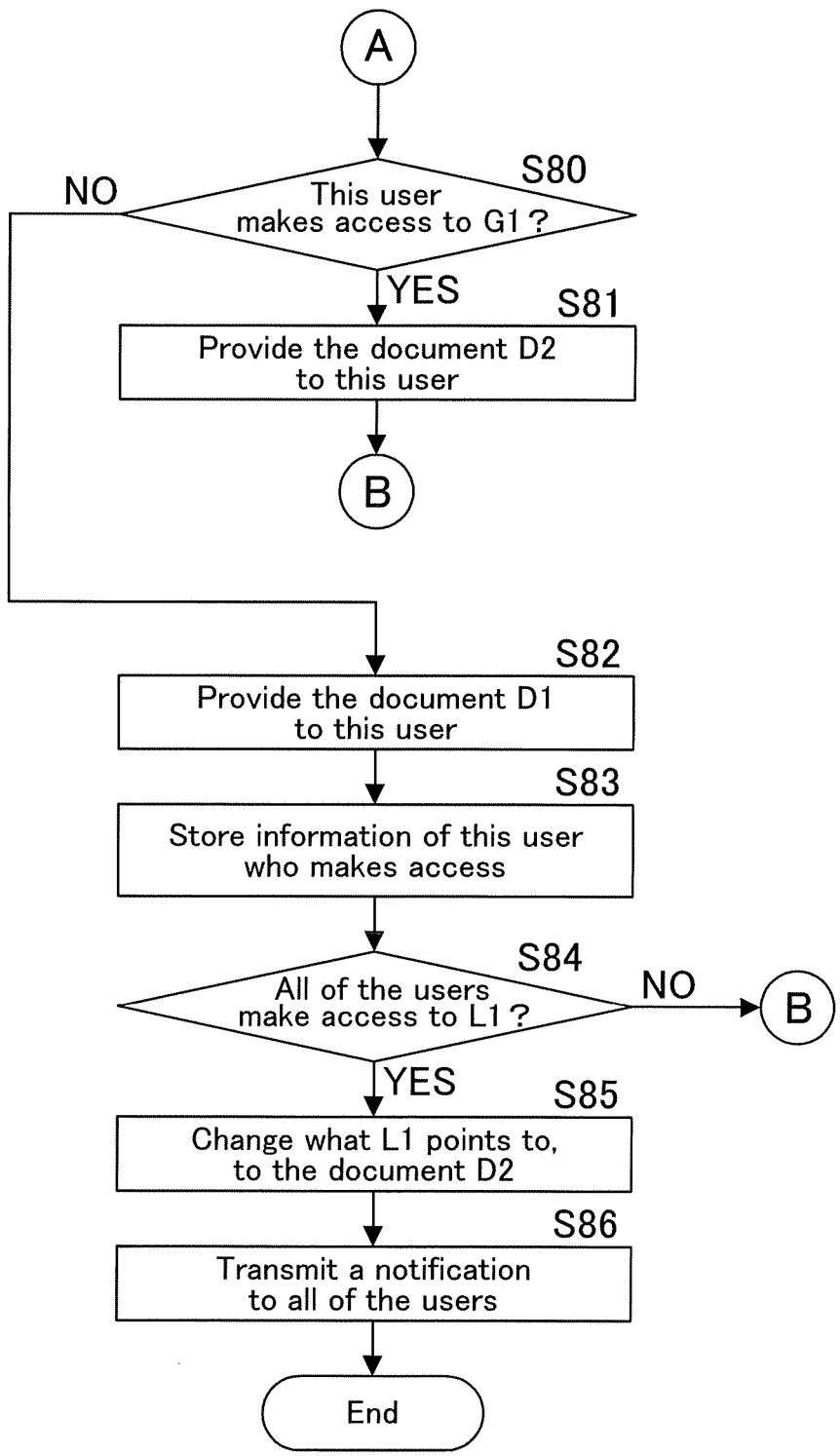
FIG. 8 is a flowchart continued from the FIG. 7.

Since Steps S50 through S57 of the flowchart in FIG. 7 are exactly the same as Steps S50 through S57 of the flowchart in FIG. 4, explanation about these Steps is omitted here.

In Step S57 of FIG. 4, if it is judged that all of the access judgment target users make access to the reference information L1 (YES in Step S57), the routine jumps ahead to Step S87 shown in FIG. 7, wherein the document D1 is updated. If it is judged that only some of the access judgment target users do not make access to the reference information L1 (NO in Step S57), the document D1 is not overwritten, but the document D2 that is the updated data is newly created and stored in the personal box G1 by the CPU 30 (see Step S78 in FIG. 7 and #8 in FIG. 6), since information sharing will not be achieved if the document D1 is updated without this judgment.

Subsequently, it is judged whether or not any of them makes access to the personal box G1 or the reference information L1 stored in the group box G2 (Step S79). If it is judged that none of them makes access (NO in Step S79), the routine waits until any of them makes access. If it is judged that any of them makes access (YES in Step S79), then it is judged by the CPU 30 whether the user makes access to the personal box G1 or the reference information L1 stored in the group box G2 (Step S80 in FIG. 8).

If it is judged that this user makes access to the personal box G1 (YES in Step S60), the document D2 is provided to this user (see Step S81 in FIG. 8 and #11 in FIG. 6) since he/she has a possibility of exactly being the user who gives an instruction to update the document D1 and maybe the document D1 that is the original data is not needed to be provided to this user again. And then, the routine returns to Step S59. On the other hand, if it is judged that this user makes access to the reference information L1 stored in the group box G2 (NO in Step S80), what the reference information L1 points to is not changed but set still as the document D1, then the document D1 is provided to this user (see Step S82 in FIG. 8 and #11 in FIG. 6), since he/she has a possibility of not being the user who gives an instruction to update the document D1 and maybe the document D1 is not yet provided to this user. In other words, execution of an instruction given to update the document D1 is suspended for the access judgment target users.

Subsequently, information of the user who makes access to the reference information L1 stored in the group box G2 is stored (Step S 83), and it is judged whether or not all of the access judgment target users make access to the reference information L1 stored in the group box G2 (Step S84).

If it is judged that not all of the access judgment target users make access (NO in Step S84), the routine returns to Step S59 since some of them do not make access to the document D1. If it is judged that all of the access judgment target users make access (YES in Step S84), the document D1 is deleted, and what the reference information L1 stored in the group box G2 points to is changed to the document D2 stored in the personal box G1, by the CPU 30 (see Step S85 in FIG. 8 and #13 in FIG. 6), since information sharing is achieved.

Then, a notification that reference information pointing to the updated data is stored in the group box G2, i.e. the original data is updated, is transmitted to all of the access judgment target users (Step S86). And then, the routine terminates.

In this embodiment as described above, if only some of the access judgment target users has made access to the reference information L1, i.e. not all of them have made access thereto when an instruction to update the document D1 is given, the document D1 that is the original data is provided to users making access to the reference information L1, until all of them make access thereto. That is, execution of an instruction given to update the document D1 is suspended for the access judgment target users, and the document D1 will be provided to all of them. In this way, information sharing is achieved. Further, if the user owning the personal box G1 makes access to the personal box G1, the document D2 that is the updated data is provided to this user, thereby an instruction given to update the document D1 is executed for the user owning the personal box G1. After the document D1 is provided to all of the access judgment target users, what the reference information L1 points to is changed to the document D2 thereby an instruction given to update the document D1 is executed, which prevents execution of the update instruction from being suspended unnecessarily longer.

Although it is assumed in this embodiment above that the group box G2 exists in the image processing apparatus 2, the group box G2 also can exist in the image processing apparatus 1 just like the personal boxes G1.

Embodiment-3

Hereinafter, a third embodiment of the present invention will be explained. In this embodiment, if only some of the access judgment target users has made access to reference information L1 when an instruction to update a document D1 is given, the document D1 stored in a personal box G1 is moved to a group box G2 and a document D2 that is the updated data is created and stored in the personal box G1. And then, the document D1 stored in the group box G2 can be accessed by the users who make access thereby execution of an instruction given to update the document D1 is suspended for them, until the document D1 that is the original data is provided to all of the access judgment target users.

Since an image processing apparatus according to the third embodiment of the present invention has the same configuration as the image processing apparatus 1 according to the first embodiment of the present invention, its explanation is omitted here.

[Operations of the Image Processing Apparatus 1]

Hereinafter, a procedure performed in the image processing apparatus 1 will be explained with reference to flowcharts shown in FIG. 9 and FIG. 10, and drawings shown in FIG. 6. This procedure is executed by the CPU 30 according to a program stored in a recording medium such as the ROM 31.

Figure 9:
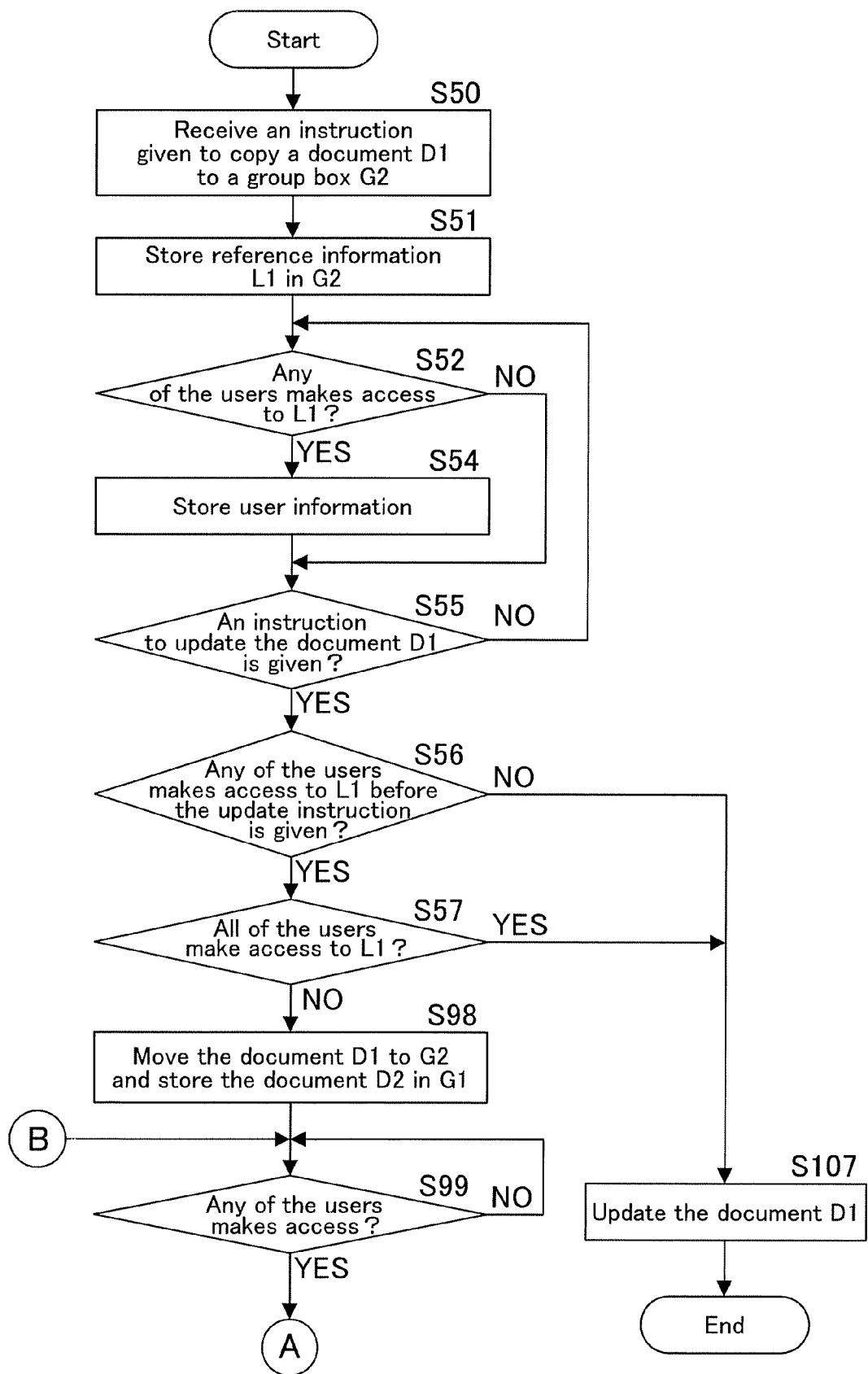
FIG. 9 is a flowchart showing a procedure performed in the image processing apparatus according to the third embodiment of the present invention.
Figure 10:
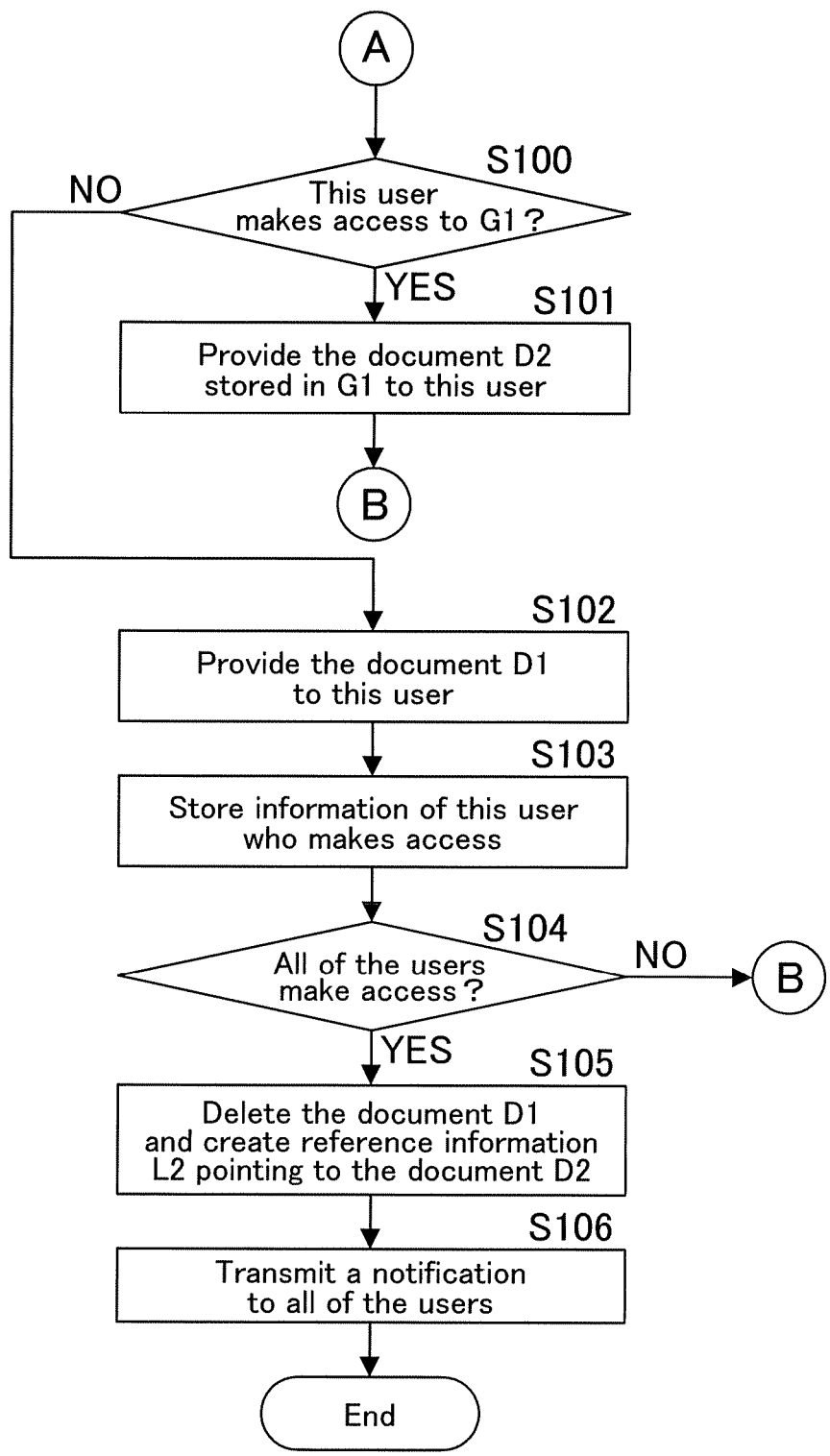
FIG. 10 is flowchart continued from FIG. 9.

Since Steps S50 through S57 of the flowchart in FIG. 9 are exactly the same as Steps S50 through S57 of the flowchart in FIG. 4, explanation about these Steps is omitted here.

In Step S57 of FIG. 4, if it is judged that all of the access judgment target users make access to the reference information L1 (YES in Step S57), the routine jumps ahead to Step S107, wherein the document D1 is updated. If it is judged that only some of the access judgment target users do not make access to the reference information L1 (NO in Step S57), the document D1 is moved to the group box G2, the document D2 that is the updated data is created and stored in the personal box G1, and the reference information L1 stored in the group box G2 is deleted, by the CPU 30 (see Step S98 in FIG. 7 and #9 in FIG. 6), since information sharing will not be achieved if the document D1 is updated without this judgment.

Subsequently, it is judged whether or not any of them makes access to the personal box G1 or the group box G2. If it is judged that none of them makes access (NO in Step S99). The routine waits until any of them makes access. If it is judged that any of them makes access (YES in Step S99), then it is judged by the CPU 30 whether the user makes access to the personal box G1 or the group box G2 (Step S100 in FIG. 10).

If it is judged that this user makes access to the personal box G1 (YES in Step S100), the document D2 stored in the personal box G1 is provided to this user by the CPU 30 (see Step S101 in FIG. 10 and #12 in FIG. 6) since he/she is the user who gives an instruction to update the document D1. And then, the routine returns to Step S99. On the other hand, if it is judged that this user makes access to the group box G2 (NO in Step S100), the document D1 stored in the group box G2 is provided to this user (see Step S102 in FIG. 19 and #6 in FIG. 6). In other words, execution of an instruction given to update the document D1 is suspended for the access judgment target users.

Subsequently, information of the user who makes access to the group box G2 is stored (Step S103), and it is judged whether or not all of the access judgment target users make access to the group box G2 (Step S104).

If it is judged that not all of them make access (NO in Step S104), the routine returns to Step S99 since some of them do not make access to the document D1. If it is judged that all of them make access (YES in Step S104), the document D1 stored in the group box G2 is deleted, and reference information L2 pointing to the document D2 stored in the personal box G1 is created in the group box G2, by the CPU 30 (see Step S105 in FIG. 10 and #14 in FIG. 6), since information sharing is achieved. And thereby, suspension of execution of an instruction given to update the document D1 stored in the personal box G1 is canceled, and the update instruction is executed.

Then, a notification that reference information pointing to the updated data is stored in the group box G2, i.e. the original data is updated, is transmitted to all of the access judgment target users (Step S106). And then, the routine terminates.

In this embodiment as described above, if only some of the access judgment target users has made access to the reference information L1, i.e. not all of them have made access thereto when an instruction to update the document D1 is given, the document D1 that is the original data is moved to the group box G2 and the reference information L1 is deleted, so that the access judgment target users can directly make access to the document D1 that is the original data. That is, execution of an instruction given to update the document D1 is suspended for the access judgment target users, until the document D1 is provided to all of them. In this way, information sharing is achieved. Further, if the user owning the personal box G1 makes access to the personal box G1, the document D2 that is the updated data is provided to this user, thereby an instruction given to update the document D1 is executed for the user owning the personal box G1. After the document D1 is provided to all of the access judgment target users, the document D1 stored in the group box G2 is deleted and the reference information L2 pointing to the document D2 stored in the personal box G1 is newly created in the group box G2, thereby an instruction given to update the document D1 is executed, which prevents execution of the update instruction from being suspended unnecessarily longer.

Although it is assumed in this embodiment above that the group box G2 exists in the image processing apparatus 2, the group box G2 also can exist in the image processing apparatus 1 just like the personal boxes G1.

Embodiment-4

Hereinafter, a fourth embodiment of the present invention will be explained. In this embodiment, the following operations are performed if an instruction to delete a document D1 is given. Even if the deletion instruction is given, the document D1 is not deleted but still stored, and what reference information L1 points to is set still as the document D1. That is, execution of the deletion instruction is suspended, until the document D1 is provided to all of the access judgment target users.

Since an image processing apparatus according to the fourth embodiment of the present invention has the same configuration as the image processing apparatus 1 according to the first embodiment of the present invention, its explanation is omitted here.

[Operations of the Image Processing Apparatus 1]

Hereinafter, a procedure performed in the image processing apparatus 1 will be explained with reference to flowcharts shown in FIG. 11 and FIG. 12. This procedure is executed by the CPU 30 according to a program stored in a recording medium such as the ROM 31.

If an instruction given by a user to copy the document D1 that is the original data stored in the personal box G1 of the image processing apparatus 1, to the group box G2 of the image processing apparatus 2, is received by the CPU 30 (Step S150 in FIG. 11), then only the reference information L1 pointing to the document D1 is stored in the group box G2 of the image processing apparatus 2 (Step S151).

Subsequently, it is judged whether or not any of the users makes access to the reference information L1 stored in the group box G2 (Step S152).

If it is judged that none of the users makes access (NO in Step S152), the routine proceeds to Step S154. If it is judged that any of the users makes access (YES in Step S152), information of the user, such as user information, is stored (Step S153), then the routine proceeds to Step S154.

In Step S154, it is judged by the CPU 30 whether or not an instruction to delete the document D1 stored in the personal box G1 is given. If it is judged that the deletion instruction is not given (NO in Step S154), the routine returns to Step S152, and repeats Steps S152 through S154 until it is judged that an instruction to delete the document D1 is given. If it is judged that an instruction to delete the document D1 is given, the judgment result is "YES" in Step S154. Then the routine proceeds to Step S155, wherein it is judged whether or not any of the access judgment target users makes access to the reference information L1 stored in the group box G2 before the deletion instruction is given. This judgment is made based on the information stored in Step S153.

If it is judged that none of the access judgment target users makes access before the deletion instruction is given (NO in Step S155), the routine proceeds to Step S157, wherein the document D1 and the reference information L1 are deleted thereby the deletion instruction is executed, since the document D1 that is the original data is not provided to any of them. And then, the routine terminates.

If it is judged that any of the access judgment target users makes access to the reference information L1 before an instruction to delete the document D1 is given (YES in Step S155), then it is judged by the CPU 30 whether or not all of them make access to the reference information L1 (Step S156).

If it is judged that all of the access judgment target users make access (YES in Step S156), the routine proceeds to Step S157 and the document D1 and the reference information L1 are deleted, since information sharing is achieved. If it is judged that only some of the access judgment target users do not make access to the reference information L1 (NO in Step S156), the document D1 is still stored in the personal box G1 but is hidden by mask processing or other by the CPU 30 (Step S158), since information sharing will not be achieved if the document D1 is deleted without this judgment.

Subsequently, it is judged whether or not any of them makes access to the reference information L1 stored in the group box G2 (Step S159). If it is judged that none of them makes access (NO in Step S159), the routine waits until any of them makes access. If it is judged that any of them makes access (YES in Step S159), what the reference information L1 points to is not changed but set still as the document $D1_1$, then the document D1 is provided to this user, since he/she has a possibility of not making access to the document D1 yet (Step S160). That is, execution of an instruction given to delete the document D1 is suspended for the access judgment target users.

Then, information of this user who makes access to the reference information L1 stored in the group box G2 is stored (Step S161), and it is judged whether or not all of the access judgment target users make access to the reference information L1 stored in the group box G2 (Step S162).

If it is judged that not all of them make access (NO in Step S162), the routine returns to Step S159, since some of them does not make access to the document D1 yet. If it is judged that all of them make access (YES in Step S162), the document D1 is deleted from the personal box G1 and the reference information L1 is deleted from the group box G2, by the CPU 30 (Step S163), and then the routine terminates. That is, suspension of execution of an instruction given to delete the document D1 stored in the personal box G1 is canceled, and the deletion instruction is executed.

In this embodiment as described above, if only some of the access judgment target users has made access to the reference information L1, i.e. not all of them have made access thereto when an instruction to delete the document D1 is given, the document D1 that is the deletion target is provided to the access judgment target users, who make access to the reference information L1. That is, what the reference information L1 points to is set still as the document D1, thereby execution of an instruction given to delete the document D1 is suspended for the access judgment target users, and the document D1 will be provided to all of them. In this way, information sharing is achieved. Further, even if the user owning the personal box G1 makes access to the personal box G1, the document D1 is hidden by mask processing or other, thereby an instruction given to delete the document D1 is executed for the user owning the personal box G1. After the document D1 is provided to all of the access judgment target users, the document D1 and the reference information L1 are deleted thereby an instruction given to delete the document D1 is executed, which prevents execution of the deletion instruction from being suspended unnecessarily longer.

Although it is assumed in this embodiment above that the group box G2 exists in the image processing apparatus 2, the group box G2 also can exist in the image processing apparatus 1 just like the personal boxes G1.

Embodiment-5

Hereinafter, a fifth embodiment of the present invention will be explained. Also in this embodiment, the following operations are performed if an instruction to delete the document D1 is given. If only some of the access judgment target users has made access to the reference information L1 when an instruction to delete the document D1 is given, the document D1 stored in the personal box G1 is moved to the group box G2 so that the access judgment target users can directly make access to the document D1 stored in the group box G2. That is, execution of the deletion instruction is suspended.

Since an image processing apparatus according to the fifth embodiment of the present invention has the same configuration as the image processing apparatus 1 according to the first embodiment of the present invention, its explanation is omitted here.

[Operations of the Image Processing Apparatus 1]

Hereinafter, a procedure performed in the image processing apparatus 1 will be explained with reference to a flowchart shown in FIG. 13. This procedure is executed by the CPU 30 according to a program stored in a recording medium such as the ROM 31.

Figure 11:
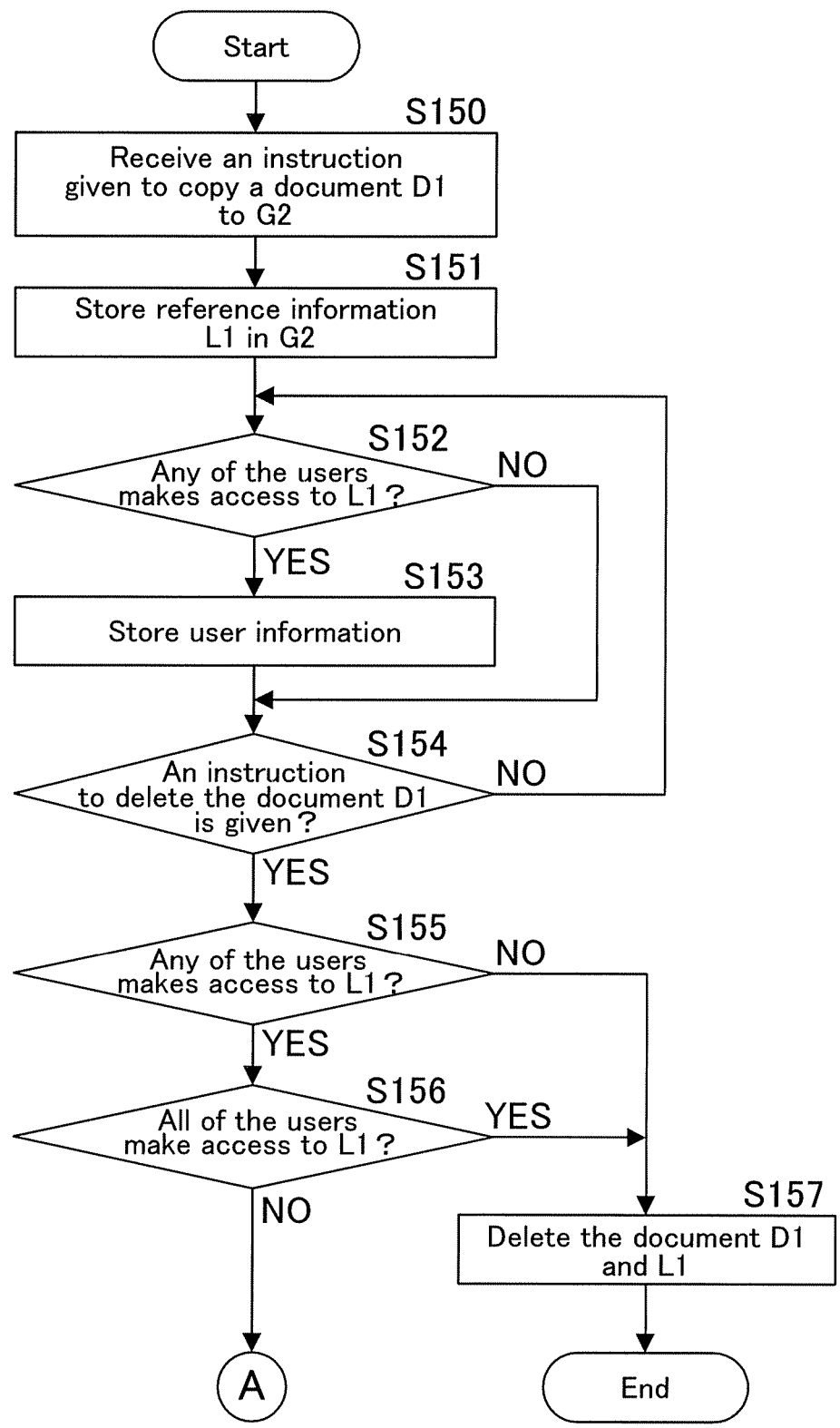
FIG. 11 is a flowchart showing a procedure performed in the image processing apparatus according to a fourth embodiment of the present invention.
Figure 12:
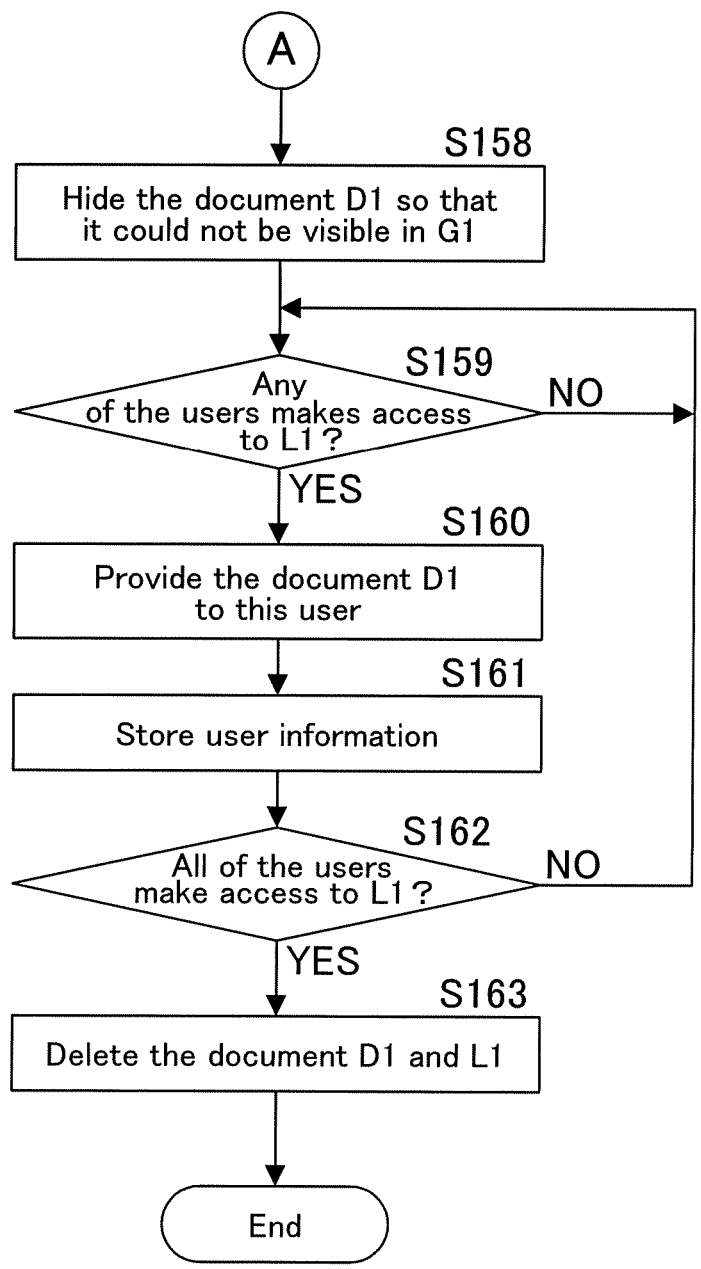
FIG. 12 is a flowchart continued from FIG. 11.
Figure 13:
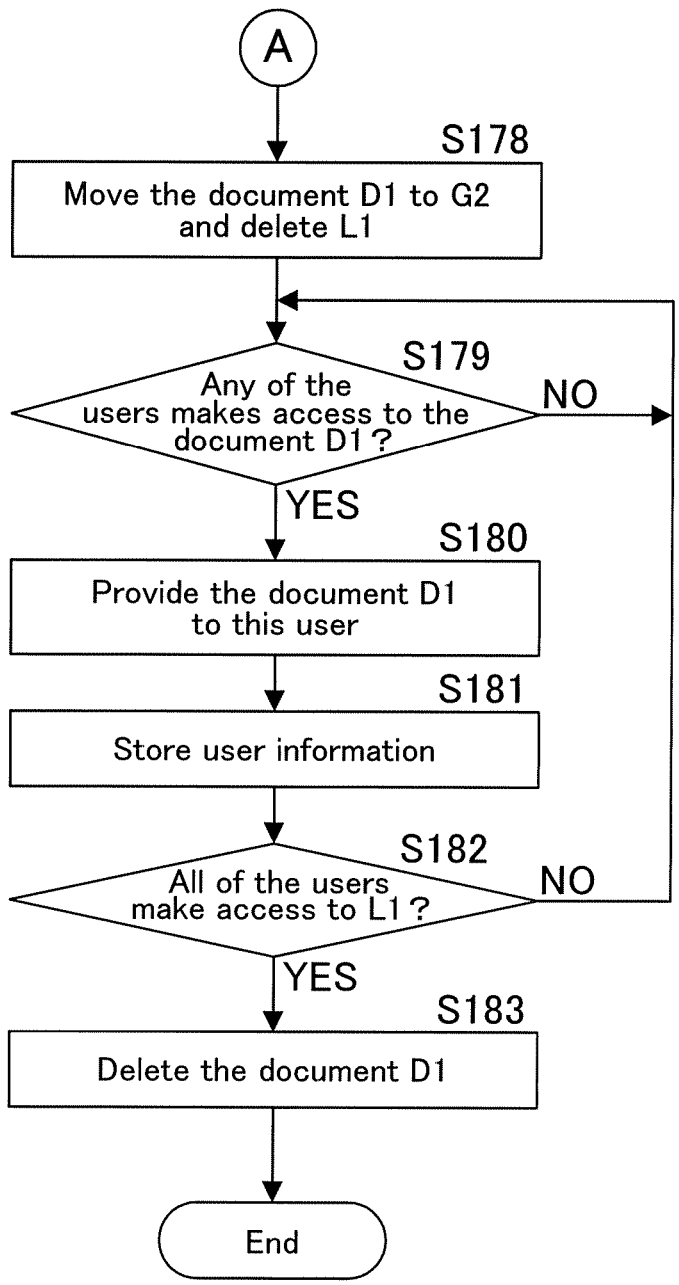
FIG. 13 is a flowchart showing a procedure performed in the image processing apparatus according to a fifth embodiment of the present invention.

Since the flowchart shown in FIG. 13 is continued from Steps S150 through S157 of the flowchart in FIG. 11, detailed explanation about the Steps will be omitted.

In Step S156 of FIG. 11, if it is judged that only some of the access judgment target users do not make access to the reference information L1 (NO in Step S156), the document D1 is moved from the personal box G1 to the group box G2 and the reference information L1 is deleted, by the CPU 30 (Step S178 in FIG. 13). And then, it is judged whether or not any of them makes access to the document D1 stored in the group box G2 (Step S179).

If it is judged that none of them makes access (NO in Step S179), the routine waits until any of them makes access. If it is judged that any of them makes access (YES in Step S179), the document D1 stored in the group box G2 is provided to this user (Step S180). That is, execution of an instruction given to delete the document D1 is suspended for the access judgment target users.

Then, information of this user who makes access to the reference information L1 stored in the group box G2 is stored (Step S181), and it is judged whether or not all of the access judgment target users make access to the reference information L1 stored in the group box G2 (Step S182).

If it is judged that not all of them make access (NO in Step S182), the routine returns to Step S179 since some of them do not make access to the document D1 yet. If it is judged that all of them make access (YES in Step S182), the document D1 is deleted from the group box G2 by the CPU 30 (Step S183), since information sharing is achieved. And then, the routine terminates.

In this embodiment as described above, if only some of the access judgment target users has made access to the reference information L1, i.e. not all of them have made access thereto when an instruction to delete the document D1 is given, the document D1 that is the original data is moved to the group box G2 and the reference information L1 is deleted, so that the access judgment target users can directly make access to the document D1 that is the original data. That is, the document D1 is still stored in the group box G2 until the document D1 is provided to all of them, thereby execution of an instruction given to delete the document D1 is suspended for the access judgment target users. In this way, the document D1 is provided to all of them and information sharing is achieved. Further, even if the user owning the personal box G1 makes access to the personal box G1, the document D1 does not exist any more in the personal box G1, thereby an instruction given to delete the document D1 is executed for the user owning the personal box G1. After the document D1 is provided to all of the access judgment target users, the document D1 stored in the group box G2 is deleted, thereby an instruction given to delete the document D1 is executed, which prevents execution of the deletion instruction from being suspended unnecessarily longer.

Although it is assumed in this embodiment above that the group box G2 exists in the image processing apparatus 2, the group box G2 also can exist in the image processing apparatus 1 just like the personal boxes G1.

All explained above are embodiments of the present invention, but the present invention is not limited to these embodiments. For example, update, deletion or other of the document D1 can be immediately reflected to the reference information L1 under the condition that all of the group users agree with that operation, even if only some of them makes access to the reference information L1 before the update or deletion. Alternatively, that operation can be immediately reflected to the reference information L1 under the condition that an arbitrary user or an authorized user among the group users agrees.

Further, although MFPs are employed as the image processing apparatuses according to these embodiments of the present invention, the image processing apparatuses are not limited to MFPs and can be any apparatuses having a box function. For example, scanners, printers and etc. can be employed in the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example" and "NB" which means "note well".

What is claimed is:

1. An image processing apparatus comprising:
a first storage area that stores in itself original data to be copied;
a copier that copies the original data to a second storage area that is shared by a plurality of users belonging to one same group and allowed to be accessed by each user of the group, by storing reference information pointing to the original data stored in the first storage area, in the second storage area;
a judger that determines whether or not any of access judgment target users who are all of the group users sharing the second storage area or preliminarily specified users selected from the group users, make access to the second storage area and access the reference information stored in the second storage area; and
a controller that suspends execution of an instruction given to change the original data for the access judgment target users, and provides the original data to the access judgment target user based on a determination of the judger that only some of the access judgment target users have made access to the reference information when the instruction to change the original data is given, and then, cancels the suspension after the original data is provided to all of the access judgment target users.

2. The image processing apparatus as recited in claim 1, wherein changing the original data corresponds to updating the original data.

3. The image processing apparatus as recited in claim 1, wherein changing the original data corresponds to deleting the original data.

4. The image processing apparatus as recited in claim 1, wherein:
changing the original data corresponds to updating the original data; and
the controller suspends execution of the instruction given to update the original data by setting the pointing destination of the reference information to the original data, until the original data is provided to all of the access judgment target users, and then, cancels the suspension by setting the pointing destination of the reference information to the updated original data, after the original data is provided to all of the access judgment target users.

5. The image processing apparatus as recited in claim 1, wherein changing the original data corresponds to updating the original data,
further comprising:
a difference information storage that stores in the first storage area, information of the difference between the original data and the updated original data; and
a data creator that creates in the first storage area, updated original data based on the original data and the difference information, and
wherein:
the controller suspends execution of the instruction given to update the original data by setting the pointing destination of the reference information to the original data, until the original data is provided to all of the access judgment target users, and then, cancels the suspension by changing the pointing destination of the reference information to the updated original data that is created by the data creator, after the original data is provided to all of the access judgment target users.

6. The image processing apparatus as recited in claim 1, wherein changing the original data corresponds to updating the original data,
further comprising:
a data creator that creates updated original data in the first storage area, separate from the original data, and
wherein:
the controller suspends execution of the instruction given to update the original data by setting the pointing destination of the reference information to the original data, until the original data is provided to all of the access judgment target users, and then, cancels the suspension by changing the pointing destination of the reference information to the updated original data that is created by the data creator, after the original data is provided to all of the access judgment target users.

7. The image processing apparatus as recited in claim 1, wherein changing the original data corresponds to updating the original data,
further comprising:
a data creator that creates updated original data in the first storage area, separate from the original data; and
a mover that moves the original data to the second storage area, and
wherein:
the controller suspends execution of the instruction given to update the original data by allowing the access judgment target users to make access directly to the original data that is moved to the second storage area, until the original data is provided to all of them, and then, cancels the suspension by setting the pointing destination of the reference information to the updated original data that is created by the data creator, after the original data is provided to all of the access judgment target users.

8. The image processing apparatus as recited in claim 1, wherein:
changing the original data corresponds to deleting the original data; and
the controller does not delete but still stores the original data in the first storage area even if the instruction to delete the original data is given, and suspends execution of the instruction given to delete the original data by setting the pointing destination of the reference information to the original data that is still stored therein, until the original data is provided to all of the access judgment target users, and then, cancels the suspension by deleting the original data that is still stored therein, after the original data is provided to all of the access judgment target users.

9. The image processing apparatus as recited in claim 1, wherein changing the original data corresponds to deleting the original data, further comprising:

a mover that moves the original data to the second storage area, if the instruction to delete the original data is given, and wherein:

the controller suspends execution of an instruction given to delete the original data by allowing the access judgment target users to make access directly to the original data that is moved by the mover to the second storage area, until the original data is provided to all of them, and then, cancels the suspension by deleting the original data that is moved to the second storage area, after the original data is provided to all of the access judgment target users.

10. The image processing apparatus as recited in claim 1, further comprising a notifier that transmits after the suspension is cancelled, a notification to let the access judgment target users know that the original data that is copied to the second storage area by storing the reference information therein, is changed.

11. The image processing apparatus as recited in claim 1, wherein the second storage area is provided in the image processing apparatus itself.

12. The image processing apparatus as recited in claim 1, wherein the second storage area is provided in another image processing apparatus.

13. The image processing apparatus as recited in claim 1, wherein the controller suspends execution of the instruction given to change the original data for the access judgment target users based on a determination of the judger that only some of the access judgment target users have made access to the second storage area to access the reference information when the instruction to change the original data is given.

14. A data processing method used in an image processing apparatus, comprising:

copying original data stored in a first storage area, to a second storage area that is shared by a plurality of users belonging to one same group and allowed to be accessed by each user of the group, by storing reference information pointing to the original data stored in the first storage area, in the second storage area;

determining whether or not any of access judgment target users who are all of the group users sharing the second storage area or preliminarily specified users selected from the group users, make access to the second storage area and access the reference information stored in the second storage area; and suspending execution of an instruction given to change the original data for the access judgment target users, and provides the original data to the access judgment target user based on a determination that only some of the access judgment target users have made access to the reference information when the instruction to change the original data is given, and then, cancelling the suspension after the original data is provided to all of the access judgment target users.

15. The data processing method as recited in claim 14, wherein the execution of the instruction given to change the original data for the access judgment target users is suspended based on a determination that only some of the access judgment target users have made access to the second storage area to access the reference information when the instruction to change the original data is given.

16. A non-transitory computer readable recording medium storing a data process program to make a computer provided in an image processing apparatus execute:

copying original data stored in a first storage area, to a second storage area that is shared by a plurality of users belonging to one same group and allowed to be accessed by each user of the group, by storing reference information pointing to the original data stored in the first storage area, in the second storage area;

determining whether or not any access judgment target users who are all of the group users sharing the second storage area or preliminarily specified users selected from the group users, make access to the second storage area and access the reference information stored in the second storage area; and suspending execution of an instruction given to change the original data for the access judgment target users, and provides the original data to the access judgment target user based on a determination that only some of the access judgment target users have made access to the reference information when the instruction to change the original data is given, and then, cancelling the suspension after the original data is provided to all of the access judgment target users.

17. The non-transitory computer readable recording medium as recited in claim 16, wherein the execution of the instruction given to change the original data for the access judgment target users is suspended based on a determination that only some of the access judgment target users have made access to the second storage area to access the reference information when the instruction to change the original data is given.

* * * * *